(12) United States Patent
Girdzijauskas et al.

(10) Patent No.: US 8,780,172 B2
(45) Date of Patent: Jul. 15, 2014

(54) DEPTH AND VIDEO CO-PROCESSING

(75) Inventors: Ivana Girdzijauskas, Kista (SE); Per Frojdh, Stockholm (SE); Clinton Priddle, Indooroopilly (AU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 208 days.

(21) Appl. No.: 13/146,380

(22) PCT Filed: May 7, 2009

(86) PCT No.: PCT/SE2009/050495
§ 371 (c)(1),
(2), (4) Date: Jul. 26, 2011

(87) PCT Pub. No.: WO2010/087751
PCT Pub. Date: Aug. 5, 2010

(65) Prior Publication Data
US 2011/0285813 A1      Nov. 24, 2011

Related U.S. Application Data

(60) Provisional application No. 61/147,512, filed on Jan. 27, 2009.

(51) Int. Cl.
*H04N 13/00* (2006.01)
*G06K 9/00* (2006.01)
*G06T 15/00* (2011.01)

(52) U.S. Cl.
USPC .............................. 348/42; 382/154; 345/419

(58) Field of Classification Search
CPC .......... H04N 13/0239; H04N 13/0055; H04N 13/0296; H04N 13/0497; H04N 13/0059; H04N 2013/0081; G06T 7/0075; G06T 2207/10012; G06T 7/0022; G06T 19/00; G06T 17/00; G06T 15/10; G06T 15/00

USPC ........................ 348/42–60; 345/419; 382/154
See application file for complete search history.

(56) References Cited

U.S. PATENT DOCUMENTS

2006/0221250 A1   10/2006   Rossbach et al.
2007/0201859 A1    8/2007   Sarrat (Continued)

FOREIGN PATENT DOCUMENTS

DE    102006055641 A1   5/2008
EP         1418766 A2   5/2004

(Continued)

OTHER PUBLICATIONS

Hasinoff, S. W. et al. "Boundary Matting for View Synthesis." Computer Image and Image Understanding, vol. 103, No. 1, Jul. 1, 2006.

(Continued)

*Primary Examiner* — Dave Czekaj
*Assistant Examiner* — Tsion B Owens
(74) *Attorney, Agent, or Firm* — Coats & Bennett, P.L.L.C.

(57) ABSTRACT

Co-processing of a video frame (32) and its associated depth map (34) suitable for free viewpoint television involves detecting respective edges (70, 71, 80, 81) in the video frame (32) and the depth map (34). The edges (70, 71, 80, 81) are aligned and used to identify any pixels (90-92) in the depth map (34) or the video frame (32) having incorrect depth values or color values based on the positions of the pixels in the depth map (34)or the video frame (32) relative an edge (80) in 5 the depth map (34) and a corresponding, aligned edge (70) in the video frame (32). The depth values or color values of the identified pixels (90-92) can then be corrected in order to improve the accuracy of the depth map (32) or video frame (34).

19 Claims, 8 Drawing Sheets

(56) References Cited

U.S. PATENT DOCUMENTS

| | | |
|---|---|---|
| 2008/0063298 A1* | 3/2008 | Zhou et al. ............... 382/280 |
| 2009/0190852 A1* | 7/2009 | Lim et al. ................. 382/256 |
| 2010/0195716 A1* | 8/2010 | Klein Gunnewiek et al. ............... 375/240.08 |

FOREIGN PATENT DOCUMENTS

| | | |
|---|---|---|
| JP | 2002150269 A | 5/2002 |
| JP | 2006214893 A | 8/2006 |

OTHER PUBLICATIONS

Kabashima, Y., "2D/3D Positioning by Back Projection and Geometrical Constraints", The IEICE Transactions on Information and Systems (Japanese Edition), May 1, 2008, pp. 1380-1392, The Institute of Electronics, Information and Communication Engineers, vol. 91-D.

* cited by examiner

DEPTH AND VIDEO CO-PROCESSING

TECHNICAL FIELD

The present invention generally relates to media processing, and in particular to co-processing of video frames and depth maps.

BACKGROUND

Free viewpoint television (FTV), also sometimes denoted multiview video and 3DTV, is a novel audio-visual system that allows users to have a 3D visual experience while freely changing their position in front of a 3D display. Unlike the typical stereoscopic television, which enables a 3D experience to users that are sitting at a fixed position in front of a screen, FTV allows users to observe the scene from many different angles, as if they were there. FTV, consequently, allows the user to interactively control the viewpoint and generates new views of a dynamic scene from any 3D position.

There are two main FTV formats, namely the multiview+depth, also known as 2D+Z, and the layered depth video (LDV) formats, the former being more common. In the multiview+depth representation, the scene is captured by many cameras and from different angles. Multiple views are then jointly compressed, by exploiting both temporal and spatial similarities that exist in different views. In order to further enable the FTV functionality, each camera view should carry additional information—a depth map. The depth map is a simple grayscale image, wherein each pixel indicates the distance between the corresponding pixel from a video object and the capturing camera. From the multiview video and depth information virtual views can be generated at an arbitrary viewing position.

The depth map can be obtained by specialized cameras, e.g. infrared or time-of-flight cameras. However, because of their price, they are still commercially ill-deployed. A common alternative instead estimates depth maps based on a number of neighboring camera views.

Having a good quality depth map is of crucial importance. Errors in depth maps translate to misplacement of pixels in the synthesized view. This is especially visible around object boundaries, where a noisy cloud around the borders becomes visible. The best available depth estimation algorithms still generally produce a quality of depth maps that is far from acceptable. The comparatively low quality in depth map estimation depends on a number of factors. Firstly, pixels in occluded regions, i.e. regions visible from one of the camera view but not in the other(s), cannot be correctly estimated.

Secondly, the neighboring views used for depth estimation are always affected by some level of sensor noise from the recording and processing equipment, which affects the accuracy of the depth maps. Furthermore, brightness constraints imposed on the video frames from the neighboring views used in depth map estimation are difficult to meet in practice.

The problems with low quality in depth maps are, further, not limited to estimated depth maps. Also the specialized cameras used for generating depth maps have limitations and introduce noise that propagates into errors in the depth maps.

There is, thus, a need for a technique allowing identification of incorrect portions in estimated or generated depth maps that can be used for the purpose of improving the accuracy and quality of the depth maps.

Document [5] discloses dynamic scene generation with interactive viewpoint control. In the image processing, an image is initially segmented to compute an initial disparity space distribution (DSD) for each segment. In a second step, the DSD of each segment is refined using neighboring segments. Finally, image matting is used for pixels along disparity discontinuities to reduce artifacts during view synthesis.

SUMMARY

Present embodiments overcome drawbacks and limitations of the prior art techniques.

It is a general objective to provide a co-processing of a depth map and a video frame suitable for use in connection with free viewpoint television.

It is a particular objective to improve the accuracy and quality of at least one of a depth map and a video frame.

These and other objectives are met by embodiments disclosed herein.

Briefly, a co-processing of a video frame comprising multiple pixels with color values and an associated depth map with depth values assigned to the pixels involves detecting at least one edge within the video frame based on the color values of pixels in the video frame. At least one corresponding edge within the depth map is also detected based on the depth values of pixels in the depth map. The video frame and the depth map are aligned or virtually merged so that the at least one edge in the video frame is aligned to the at least one edge in the depth map. Aligned pairs of edges are then used for identifying pixels in one of the depth map and the video frame, preferably in the depth map, having incorrect pixel property values, i.e. depth values or color values. Such an incorrect pixel is identified based on the position of the pixel in the depth map or video frame relative an edge in the depth map or the video frame and a corresponding, aligned edge in the video frame or the depth map.

The co-processing of the video frame and the depth map, thus, allows identification of those pixels that have got incorrect depth values or color values during the estimation or recording of the depth map or the video frame. Identified pixels can then be corrected by replacing their incorrect pixel property values with correct pixel property values obtained or determined from neighboring pixels in the depth map or the video frame. The accuracy and the quality of the depth map or the video frame is thereby increased, which is important when using the depth map and the video frame in the synthesis of a new virtual view in a free viewpoint television system.

A co-processing system has an edge detector for detecting at least one respective edge in the video frame and its associated depth map based on color values and depth values in the video frame and the depth map, respectively. An aligner aligns the detected edges so that the pixel coordinates of an edge in the video frame should match as close as possible the pixel coordinates of a corresponding edge in the depth map. The co-processing system also comprises a pixel identifier provided for identifying at least one pixel in the depth map/video frame having incorrect depth value/color value based on the position of the at least one pixel relative an aligned pair of edges in the depth map and the video frame.

The co-processing of the embodiments, thus, enables improvement of the quality of depth map-video frame pairs by sharpening edges and thereby increasing the accuracy in pixel property values, which improves any virtual view synthesis using the depth map-video frame pair as basis.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference numbers are used for similar or corresponding elements.

Embodiments as disclosed herein relates to co-processing of image data and depth data in connection with free viewpoint television (FTV) and other visual systems in which a true three dimensional (3D) visual experience can be created regardless of the position of the viewer. Though, FTV is the most common term for this technique in the art, another used term is 3DTV even though 3DTV actually, when used correctly, refers to stereoscopic television, which merely provides a 3D visual experience at a fixed position in front of the display screen. Multiview video is sometimes used to denote the effect achieved by FTV, in particular when the video cameras from a multiview set are close enough to make a stereo pair.

Figure 1:
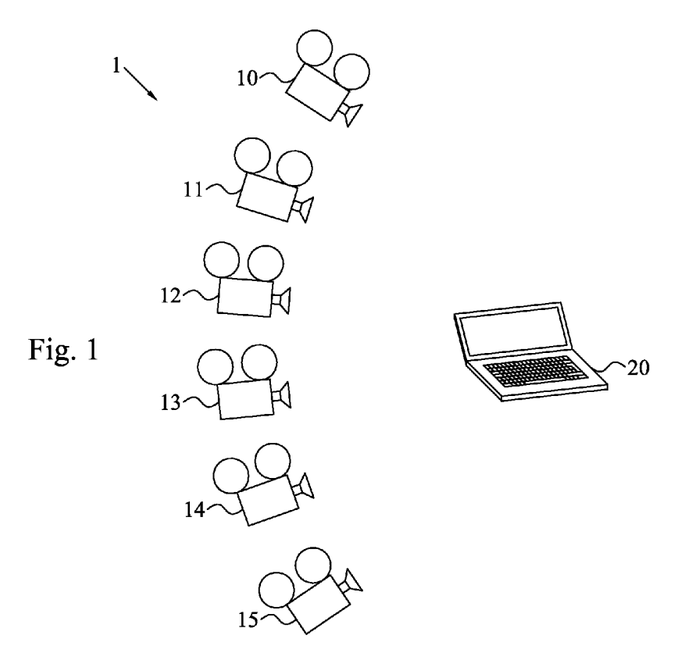
FIG. 1 is a schematic overview of an array of cameras useful when recording multiview video.

FIG. 1 is a schematic illustration of an array 1 of cameras 10-15 that can be used to collect image data for the purpose of FTV. Thus, in FTV, and more correctly in the multiview+depth format of FTV, a scene, represented by a laptop 20 in the figure, is captured by multiple, i.e. at least two but generally more, cameras 10-15 from different angles. There is a vast number of different cameras arrays 1 and arrangements that can be used to capture a scene from different angles. The camera array 1 illustrated in the figure should therefore merely be seen as in illustrative, but non-limiting, example. Other array examples include linear camera arrays, circular camera arrays, two dimensional camera arrays, etc.

The cameras 10-15 of the camera array 1 generate image or video data, i.e. pixels having respective color values as pixel property values, from the different scene angles. The same cameras or specialized cameras, such as infrared or time-of-flight cameras, could be used to additionally generate depth data, i.e. pixels having depth values as pixel property values. Alternatively, the depth data can be estimated from the video data. The depth of a view is estimated based on a number of, generally two, neighboring views. In general, depth estimation algorithms can be classified into local, global and segment-based algorithms. Local estimation algorithms consider fixed and finite windows of pixel values to determine the pixel depth. Global estimation algorithms, in clear contrast, estimate depth of all pixels simultaneously by applying energy minimization techniques, such as graph cuts [1,2] or belief propagation [3]. Finally, segment-based depth estimation methods [4,5] represent the image with a set of non-overlapping segments, and where the depth of each segment is usually approximated as a linear function of pixels therein.

It is anticipated by the embodiments that FTV can be generated from synthetic video and image data. In such case, no physical array of cameras recording a scene is used but video or image data from multiple different angles of a scene are instead synthetically created. There is, from FTV point of view, generally no difference between recorded and created video data as in both cases, depth data is additionally needed in order to enable a true 3D visual representation.

Figure 2:
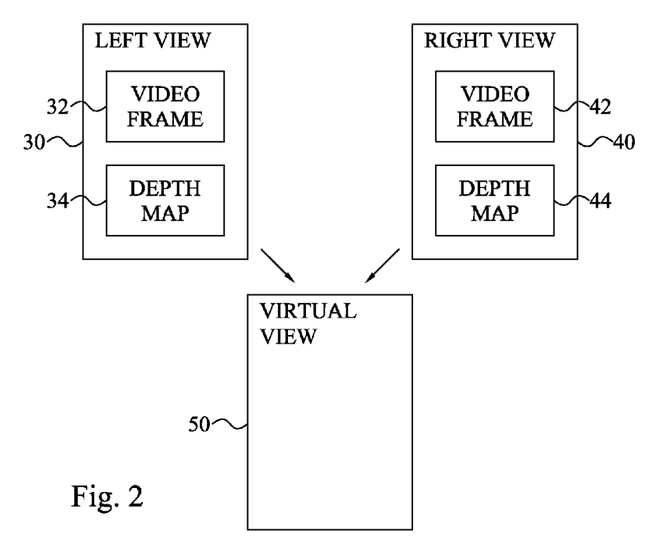
FIG. 2 is a schematic illustration of synthesizing virtual views in a video sequence.

FIG. 2 schematically illustrates how a virtual view 50 at an arbitrary viewing position is generated from video and depth data. The figure shows a first or left camera view 30, such as one of the camera views in FIG. 1, with its associated video data in the form of one or more video frames 32 with associated depth data represented by a depth map 34. A second or right view 40, which is typically a neighboring view in the camera array of FIG. 1, has corresponding video frame/frames 42 and depth map 44. The video frames 32, 42 and depth maps 34, 44 are co-processed in a manner well-known in the art to generate the virtual view 50 at a viewing position between the left view 30 and the right view 40.

In the following, embodiments are described in more detail relating to a co-processing method in which a video frame comprising multiple pixels with color values as pixel property values of a camera view is co-processed with a depth map comprising multiple pixels having respective depth values as pixel property values of the camera view. The video frame could constitute one video frame of a sequence of multiple video frames originating from a camera view, regardless of whether the camera view is of a physical camera or represents an imagined or virtual camera view for a synthesized video frame. The video frame must, however, not necessary constitute a part of a video frame sequence but can be a single video frame or (still) image. Thus, the expression video frame as used herein encompasses both a video frame from a sequence of video frames and a single image.

The video frame is divided into pixels or image elements each having a respective pixel property value in the form of a color value. There are several different color formats known in the art and that can be used in connection with video frames including, but not limited to, red, green, blue (RGB) and luminance versus chrominance, such as YUV, $YC_oC_g$ and $YC_rC_b$. The video frame also has an associated depth map with pixels having respective depth values representing the distance between the corresponding pixel from a video object, i.e. scene element, and the capturing camera. In the technical field, such depth map data is generally represented as a grayscale value, such as between 0 and 255 for a resolution with 256 different depth levels. The depth data can optionally be carried by a fourth channel, denoted alpha channel, where each pixel has a RGBA value. The three first channels, RGB, represent the red, green and blue components of the color values and the fourth channel carries the depth data.

There can be a one-to-one relation between a video frame from a video sequence of a camera and a depth map. Alternatively, the rate of depth maps can be lower than the frame rate so that at least two consecutive video frames from the camera share the same depth map.

Figure 3:
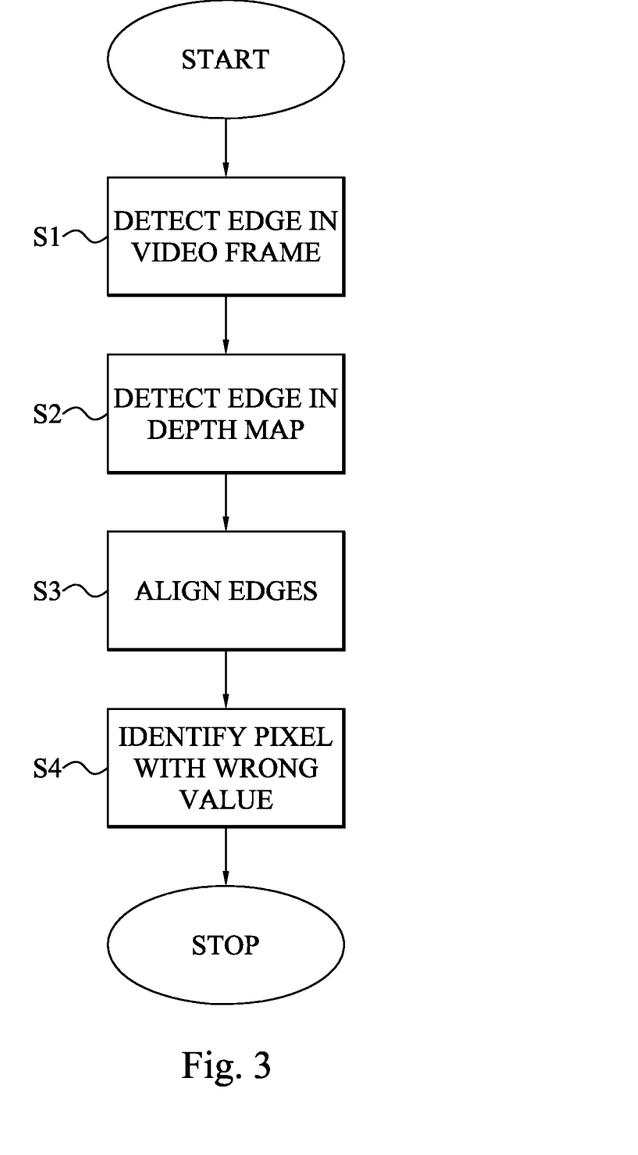
FIG. 3 is a flow diagram illustrating a method of co-processing video frames and depth maps according to an embodiment.

FIG. 3 illustrates a flow diagram of an embodiment of the co-processing method. The method generally starts in step S1, where at least one edge is detected in the video frame based on respective color values of at least a portion of the pixels in the video frame. Step S1 can involve detecting one or a few edges in the video frame, where the edge or edges is or are then typically selected in advance. In an alternative approach, all the edges present in the image data of the video frame is detected based on the color values of the pixels in the video frame.

Figure 4:
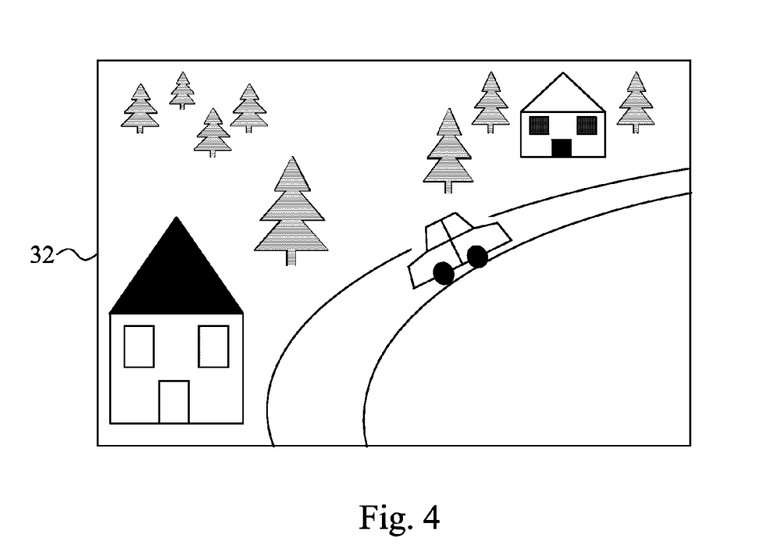
FIG. 4 is a schematic example of a video frame.

Edges in a video frame occur at the borders between video frame regions or segments having significantly different color values or more correctly different distributions of color values. FIG. 4 is a schematic representation of a video frame 32 of a scene. Edges in the color value data is marked with black lines in the video frame. Thus, edges are present, among others, at the borders between the trees and the ground, at the borders between the houses and the ground, at the borders between the road and the ground and at the borders between the car, the road and the ground. The two houses also comprise different regions having different color values distributions, i.e. roof, outer wall, windows and doors. Edges are consequently found around these regions.

It is anticipated by the invention that the detected edges are preferably internal edges between different regions within the video frame.

Edge detection can be conducted automatically using a so-called edge detection algorithm. There is wealth of such edge detection algorithms known within the technical field. The edge detection algorithms generally detect sharp changes in image brightness between different pixel regions. Non-limiting examples of edge detection techniques that can be used to identify the at least one edge in the video frame in step S1 include the Sobel operator that is based on computing an approximation of the gradient of the image intensity function, the Prewitt method that calculates the maximum response of a set of convolution kernels to find the local edge orientation for each pixel, the Robert's Cross operator that works by computing the sum of the squares of the differences between diagonally adjacent pixels, the Laplacian algorithm, the Gaussian algorithm, the Canny edge detector operator, the differential edge detection algorithm using a differential approach of detecting zero-crossings of the second-order directional derivative in the gradient direction, or any other known edge detection algorithm. Document [6] gives a detailed overview of different edge detection algorithms developed in the field and that can be used in step S1.

The edge detection in the video frame of step S1 may alternatively be conducted manually by an operator looking at the video frame. Edges between pixel regions having different distributions of color values, such as in the borders of sharp brightness changes, can then be visually identified and marked by the operator. The operator then preferably contours the at least one edge so that the pixel coordinates for the at least one edge are registered for later use.

Also a combination of automatic and manual edge detection can be used. For instance, an automatic edge detection can first be conducted in step S1 followed by a manual verification and correction procedure in order to manually correct any obvious errors performed by the automatic edge detection algorithm.

The next step S1 detects at least one edge in the depth map associated with the video frame. This edge detection of step S2 is performed based on respective depth values of at least a portion of the multiple pixels in the depth map. Generally, edge detection in the depth map can be performed in a similar way to edge detection in the video frame with the only difference that in step S1 the pixels had color values as pixel property values but in step S2 the pixels have depth values, typically in the form of grayscale values, as pixel property values. Any of the above-identified automatic edge detection algorithms can be used to conduct an automatic detection of at least one, preferably all edges in the depth map. Alternatively, manual edge detection or a combination of automatic and manual edge detection can be conducted in similarity to step S1. In some applications it could be preferred to use the same type of edge detection in both step S1 and step S2.

Edges in the depth map are consequently preferably detected as borders between regions in the depth map having different distributions of depth values and preferably in connection with sharp or abrupt changes in the grayscale values.

Figure 5:
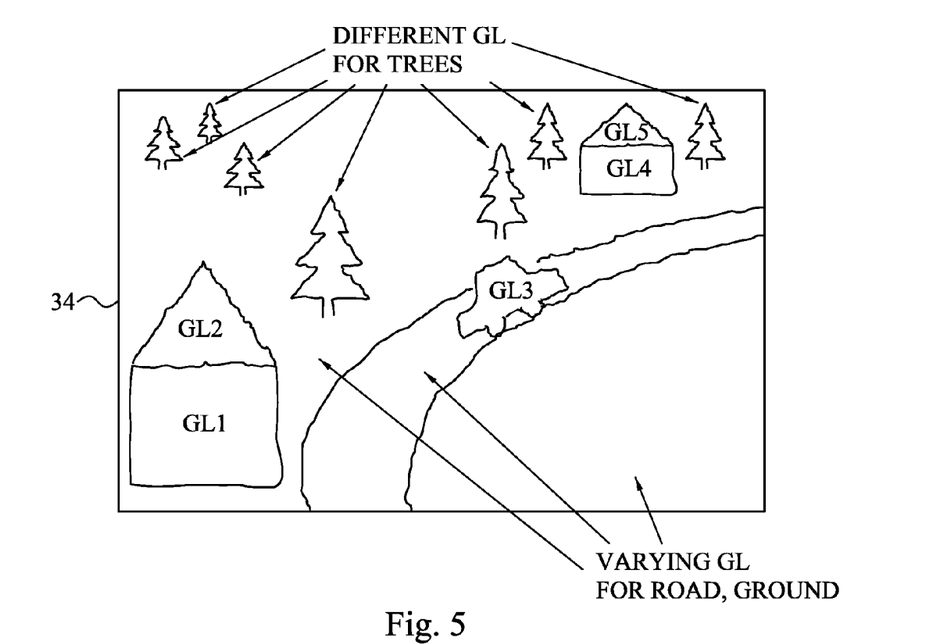
FIG. 5 is a depth map corresponding to the video frame in FIG. 4.

FIG. 5 is the depth map 34 corresponding to the video frame illustrated in FIG. 4. In this illustrative example, the front walls, the roofs, the car and the trees all have different gray levels (GL) representing different respective depth values for these elements in the scene. The gray levels on the road and ground change smoothly as the distance from the camera increases. The edges between these regions of either constant or slowly changing gray levels are clearly seen in the FIG. and can be detected by an edge detection algorithm and/or manually by the operator. Depth maps are most often less detailed as compared to the video frames, as can be seen in the front house of FIGS. 4 and 5. Although, the front facade has different texture from the windows and the door, they all have the same depth and therefore the same gray level with the resolution of the depth map illustrated in FIG. 5.

In the co-processing method of FIG. 3, step S2 has been illustrated as following step S1. This should, however, merely be seen as an illustrative example. The order of steps S1 and S2 may actually be interchanged so that edge detection in the depth map is conducted prior to edge detection in the video frame. Not only sequential edge detection is possible in the co-processing method. In a parallel processing, edge detection in the depth map is performed at least partly in parallel with the edge detection in the video frame.

The next step S3 aligns the at least one edge in the depth map detected in step S2 and the corresponding at least one edge in the video frame detected in step S1. The step S3 generally involves aligning the video frame and the depth map so that the corners of the depth map and video frame become overlain if the video frame and depth map have the same size, which is preferred. The detected edges will then automatically be aligned relative each other. The edge alignment of step S3 must, however, not necessarily be conducted by aligning the complete video frame and depth map. In clear contrast, the coordinates, typically in terms of pixel coordinates, of the at least one edge detected in the video frame can be aligned with the corresponding coordinates of the edge in the depth map.

The aligned edges from step S3 are used in step S4 to detect at least one pixel in the depth map or in the video frame having an incorrectly assigned or generated pixel property value. Thus, errors in depth values for estimated or indeed camera-captured depth maps can be identified in step S4 based on the aligned edges. Correspondingly, although less common as the video frame generally has more detailed structures and are generally more accurately represented, at least one pixel in the video frame having incorrect color value could be identified in step S4. This latter case can, in particular occur, after a lossy compression and the following decompression of the video frame, whereby decompressed or decoded pixel color values can be incorrect due to the lossy compression.

The at least one pixel identified in the depth map or video frame in step S4 is further identified based on the position of the pixel or pixels in the depth map or video frame relative an edge in the depth map or video frame and the corresponding aligned edge in the video frame or depth map. Thus, two aligned edges, one in the depth map and one in the video frame, are used in step S4 for identifying at least one pixel having incorrect pixel property values.

In the following, embodiments will be described in more detail in connection with identifying and preferably correcting pixels in the depth map having incorrect depth values. This should, though, be seen as a preferred but non-limiting example, as other embodiments could alternatively identify and preferably correct pixels in the video frame having incorrect color values.

The edge in the depth map or video frame and the corresponding aligned edge in the video frame or depth map used in step S4 for the purpose of identifying a pixel having incorrect depth value or color value are preferably edges that are positioned close the coordinate of the pixel in depth map or video frame. Generally, the identified pixel is present adjacent to or at least in the neighborhood around the edge.

Step S4 can involve identifying a single pixel or multiple pixels having incorrect pixel property values. In the latter case, the same pair of aligned edges can be used for all incorrect pixels if these pixels are present in the depth map or video frame close to the aligned edges. Alternatively, a first pair of aligned edges is used for identifying a first set of at least one incorrect pixel and a second pair of aligned edges is used for identifying a second set of at least one incorrect pixel. Furthermore, though it is most often enough to use one pair of aligned edges in order to identify a pixel having incorrect pixel property value, multiple aligned edges can be used in particular for pixels occupying coordinates present in corners of scene elements.

Figure 6:
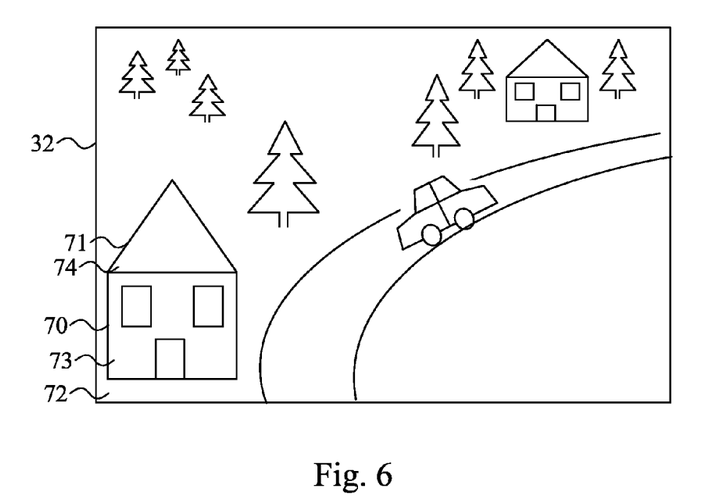
FIG. 6 illustrates edges detected in the video frame of FIG. 4.

Co-processing of a video frame and a depth map according to an embodiment of the co-processing method in FIG. 3 will be further described herein in connection with FIGS. 6 to 10. FIG. 6 illustrates the edges 70, 71 detected in the video frame 32 illustrated in FIG. 4. In the figure only two of the edges 70, 71 have been marked with reference signs in order to simplify the drawing. The marked edges 70, 71 are present in the border between the ground region 72 and the region 73 corresponding to the front wall of the house, and between the ground region 72 and the roof of the house 74.

Figure 7:
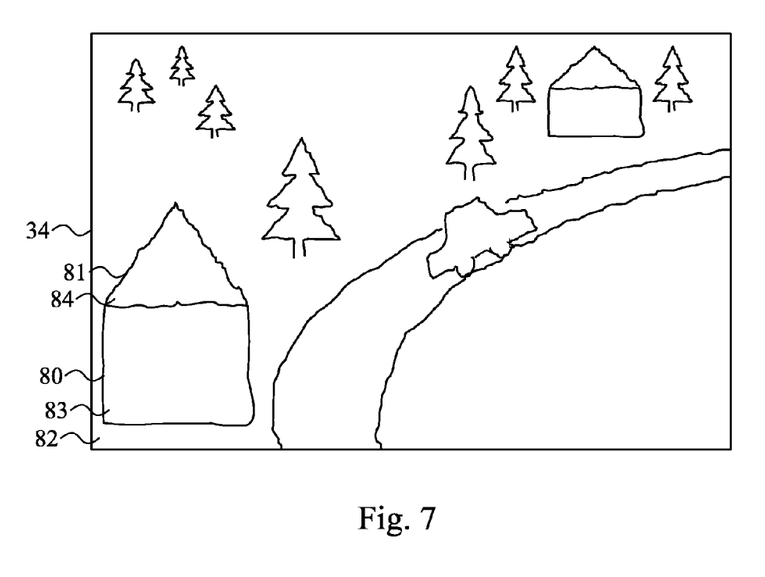
FIG. 7 illustrates edges detected in the depth map of FIG. 5.

FIG. 7 illustrates the corresponding depth map 34 with its detected edges 80, 81. The same edges 80, 81 and regions 82, 83, 84 described above and marked in FIG. 6 have also been marked with reference signs in FIG. 7. FIGS. 6 and 7 correspond to an embodiment of steps S1 and S2 of FIG. 3.

Figure 8:
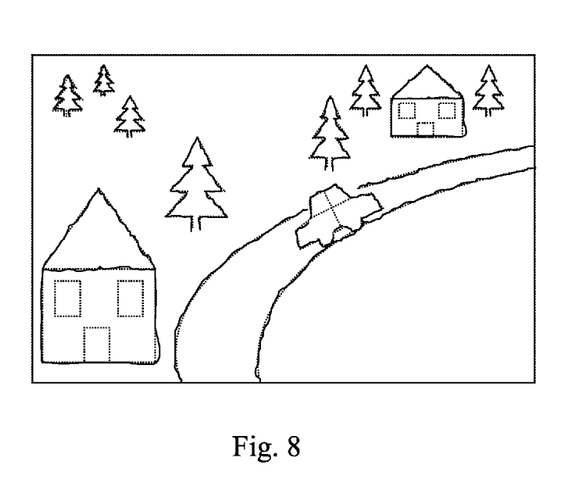
FIG. 8 illustrates an alignment of the edges in the video frame of FIG. 6 with the edges in the depth map of FIG. 7.

The depth map and video frame with marked edges in FIGS. 6 and 7 have been aligned or merged in FIG. 8. The respective edges are consequently aligned or merged. In the figure, dotted lines correspond to edges from the video frame, while the solid lines correspond to edges from the depth map. It is seen in the figure that for some of the edges in the video frame there is a corresponding aligned edge in the depth map. However, other edges, such as between the doors/windows and the front walls and the windows/doors of the car, have no matching edges in the depth map. The reason for this is that there is no detectable difference in depth between the doors/windows and the front walls and the windows/doors of the car with the depth resolution used in the present example.

Figure 9:
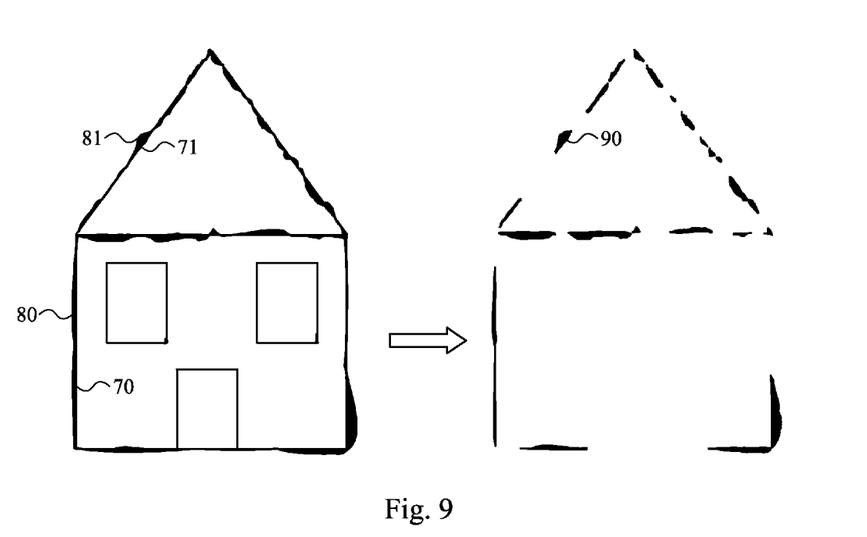
FIG. 9 is a magnification of a portion of the drawing presented in FIG. 8 illustrating identification of pixels with incorrect pixel property values.

It is also clear from the figure that the aligned edges do not fully match each other in terms of coordinates. The reason for this is that the depth values are incorrectly estimated or generated for some of the pixels in the depth map. This lack of coincidence between edges is used to identify and preferably correct erroneous pixels and pixel property values. FIG. 9 is a magnification of the house in the lower left corner of FIG. 8, showing those portions or pixels 90 in the front house that are identified to be incorrectly estimated and marked in gray in the figure. These incorrect portions 90 of the depth map correspond to the portions where the edges 70, 71, 80, 81 from the video frame and the depth map do not coincide but instead encompass incorrect portions 90.

Figure 10:
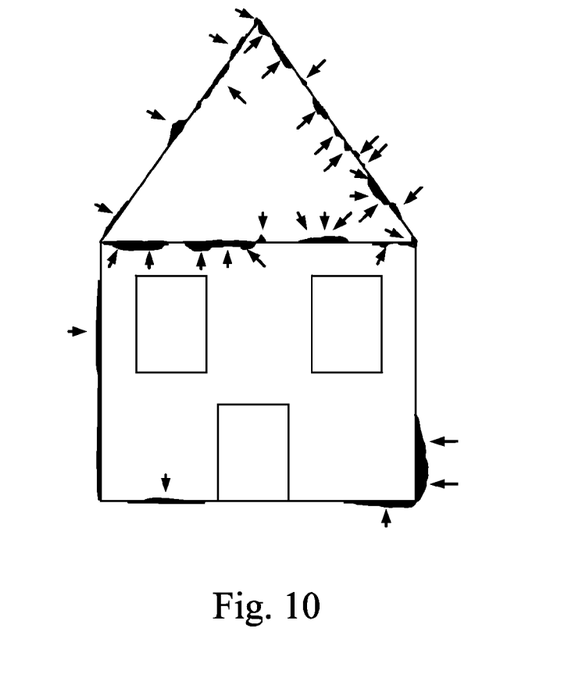
FIG. 10 illustrates correcting property values of pixels with incorrect pixel property values.

In this embodiment, step S4 of FIG. 3 consequently involves identifying the at least one pixel 90 having incorrect pixel property value, depth value in this example, as being enclosed by an edge 80, 81 in the depth map and the corresponding aligned edge 70, 71 in the video frame. The coordinates of enclosed pixels 90 can be identified from the aligned depth value and video frame as illustrated in FIG. 9. The pixels in the depth map having positions coinciding with the identified coordinates can then be noted as pixels in the depth map having incorrect depth values. The incorrect depth values are preferably corrected or replaced by other depth values, which is schematically illustrated in FIG. 10. FIG. 10 illustrates that incorrectly estimated regions in the depth map are replaced with the closest available correctly estimated region or pixel that belongs to the same partition determined by the edges. The arrows shown in FIG. 10 indicate the regions from which depth values should be taken in order to correct depth values in the incorrectly estimated regions, towards which the arrows point. For instance, in the lower left part of the house in FIG. 10, some of the pixels inside the house border are estimated, in the depth map, as belonging to the ground. The depth values of these pixels should thereby be replaced by the correct depth value of pixels present in the area occupied by the outer wall of the house. The depth value or values of one or more pixels within this region, i.e. the outer wall, having correct depth value is or are then used to determine the property value or value to assign to the incorrectly estimated pixels.

For some incorrectly estimated pixels it is enough to consult a single correctly estimated pixel belonging to the region of the depth map to which the incorrectly estimated pixel actually would belong. This is true for those regions and pixels in the depth map which should have a single, same depth value, such as the front wall of the house.

Other incorrectly estimated pixels might need more than one other pixel in order to determine the correct pixel property value to replace the incorrect value. For instance, in the lower right corner of the house, several pixels in the depth map have incorrectly been assigned depth values corresponding to the front wall of the house even though they belong to the ground as is evident from the aligned edge pairs. However, the ground does not have a single depth value but rather a slowly varying gray level as was indicated in FIG. 5. In such a case, multiple pixels in the depth map present at the same respective distance from the correct wall-ground edge as indicated in the video frame can be consulted in order to determine the appropriate depth values for the incorrectly estimated pixels.

Figure 11:
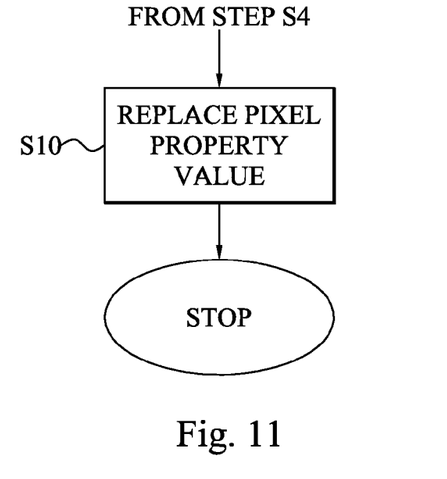
FIG. 11 is a flow diagram illustrating an additional, optional step of the co-processing method in FIG. 3.

FIG. 11 is a flow diagram illustrating this additional and preferred replacing step of the co-processing method in FIG. 3. The method continues from step S4 identifying pixels with incorrect pixel property values. The next step S10 replaces the incorrect property values with pixel property valued determined based on pixel property value or values of at least one other pixel in the one of the depth map and the video frame containing the pixels with incorrect pixel property values. In a typical embodiment of step S10, both the depth map and the video frame are divided into multiple regions having different distributions of depth values (gray levels) and color values, respectively, as illustrated in FIGS. 6 and 7. An incorrect pixel property value is then replaced with a pixel property value determined based on the pixel property value or values of at least one other pixel belonging to the same region in the depth map or the video frame as the pixel identified in step S4 of FIG. 3, which is illustrated in FIG. 10.

The pixel identification and value replacement of the co-processing method can be performed manually by the operator or automatically by hardware implemented FTV processing device or by a software algorithm installed and run in a computer-based FTV processing device or computer.

The pixel correction procedure described above and illustrated in FIGS. 6 to 10 has been conducted on already estimated or generated depth maps and video frames, such as a post-processing step in a depth map estimation procedure. However, if depth maps are estimated from video frames as previously disclosed, identification of incorrect pixel property values, typically depth values, and correction thereof can alternatively or additionally be done during the estimation process.

Sometimes depth maps are recorded at lower resolution than the video frames. Examples include when different technologies are used to scan the depth map, such as time-of-flight, or when a second low-resolution camera is used to estimate depth of the video shot by a high-resolution camera.

Figure 13:
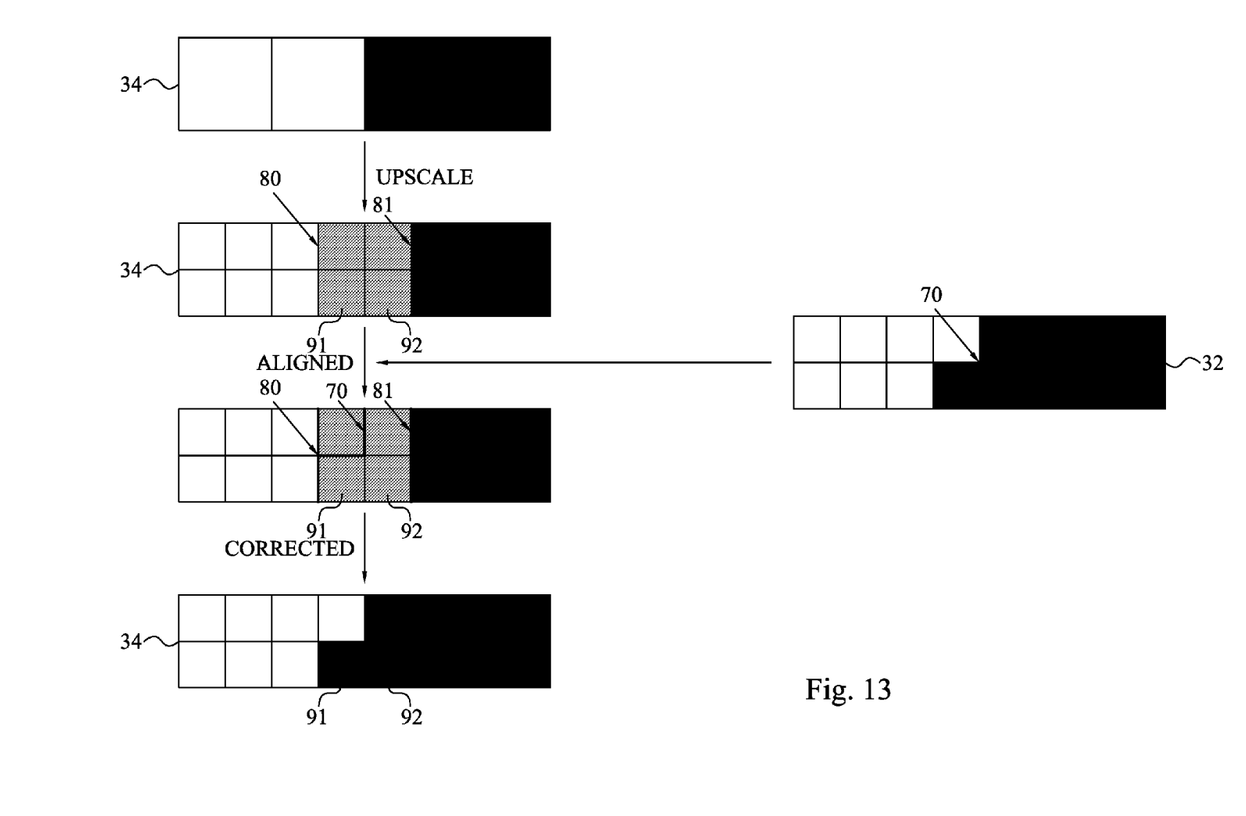
FIG. 13 schematically illustrates correcting pixel property values during upscaling of a depth map.

The resolution of the depth maps can be increased by predictions from neighboring pixels, preferably in the form of bilinear prediction or interpolation. This procedure is schematically illustrated in FIG. 13. The upper left portion of the figure illustrates a portion of a depth map 34 having half the resolution in the x- and y-direction as compared to the corresponding video frame portion 32 illustrated to the right in the figure. In an upscale procedure, the resolution of the depth map 32 is doubled through bilinear prediction to correspond to the resolution of the video frame 34. In practical applications, one or more consecutive such upscaling procedures and bilinear predictions might be necessary in order to reach the preferred same resolution as the video frame 32.

The upscaling introduces blurring in the high resolution version of the depth map 34, which is illustrated in the second upper left portion of the figure. The interpolated pixels 90, 91 in the blurred region have incorrectly estimated depth values and can consequently be identified and preferably corrected by the co-processing method of an embodiment. Thus, information of a corresponding edge 70 present in the video frame 32 is used to identify the incorrectly estimated pixels 90, 91 by aligning the edge 70 from the video frame 32 with the matching edge or edges 80, 81 in the upscaled depth map 34, which is schematically illustrated in the second lower portion of the figure. In this example, four pixels 91, 92 are enclosed by the respective aligned edges 70, 80, 81 from the depth map and the video frame. These pixels 91, 92 are consequently identified as having incorrect depth values.

Correct depth values from neighboring pixels can then be used to correct these depth values, which as been down in the lower left portion of the figure. Guidance regarding which particular neighboring pixel to use in this value correction can come from the position of the interpolated pixel 91, 92 relative the aligned edges 70, 80, 81. The correct position of the edge 70 between the two neighboring regions having different depth and color values in the video frame 32 can also be used to identify, which particular neighboring pixels in the depth map 34 to use when determining correct values for the interpolated pixels 91, 92.

Figure 12:
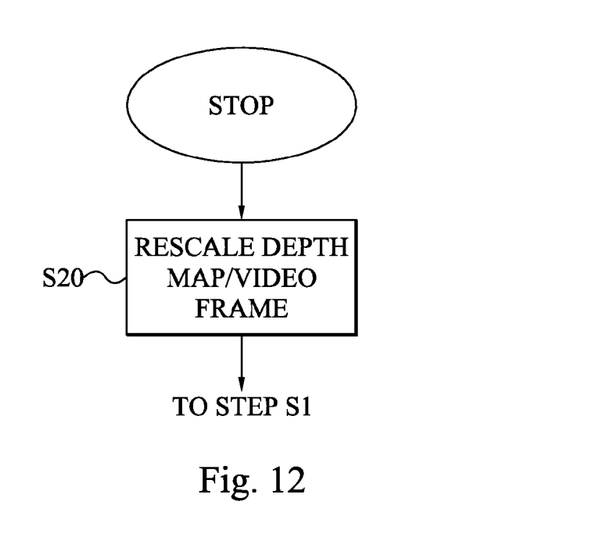
FIG. 12 is a flow diagram illustrating an additional, optional step of the co-processing method in FIG. 3.

FIG. 12 is flow diagram illustrating an additional step of the co-processing method performed during pre-processing of depth maps. The method involves rescaling the depth map or video frame to have preferably the same size in terms of the number of pixels as the one of the depth map and the video frame having the highest resolution. This generally involves interpolating pixel property values in the depth map or the video frame to form new pixels having interpolated pixel property values. The method then continues to step S1 of FIG. 3. Step S4 of FIG. 3 preferably involves identifying at least one pixel among the interpolated pixels based on the position of the pixel relative the corresponding aligned edges in the depth map and the video frame as previously described.

The co-processing method can consequently be performed inline with the depth map estimation or generation process or can be done separately as a post-processing step. Moreover, depth correction in the depth map or indeed color correction in the video frame can be performed in connection with compression or encoding of the depth and color data and/or in connection with decompression or decoding of compressed or encoded depth and color data.

Poorly estimated or generated depth maps seriously degrade the quality of synthesized views in FTV, by creating clouds around the scene element borders, which results in an annoying visual experience. The co-processing method disclosed herein can identify portions of the depth map that are poorly estimated and may additionally correct these identified portions to significantly improve the quality of the depth maps and, thus, the synthesized virtual views.

The co-processing method is based on using one of the depth map and the video frame as correction basis for identifying incorrect pixels in the other of the depth map and the video frame. In some applications both the depth map and the video frame comprise incorrect pixels. In such a case, an aligned pair of edges can be used to identify and correct incorrect pixels in the depth map. Another pair of edges or another part of the same edge pair is correspondingly used for identifying and correcting incorrect pixels in the video frame.

The co-processing may actually be conducted in multiple steps. For instance, first incorrect pixels are identified and corrected in the depth map to get a refined depth map. Edges in the refined depth map are aligned to edges in the video frame for the purpose of identifying and correcting incorrect pixels in the video frame to get a refined video frame. Optionally, the refined video frame and the refined depth map are once more aligned to further improve the quality of the refined depth map, and so on.

Figure 14:
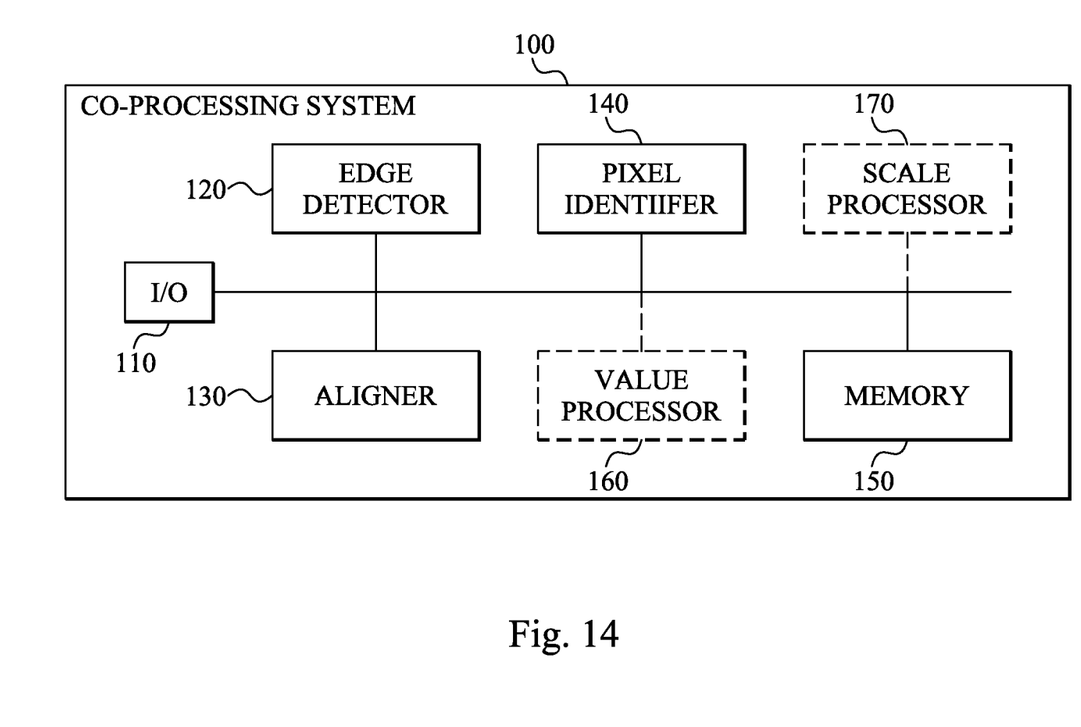
FIG. 14 is a schematic block diagram of a co-processing system according to an embodiment.

FIG. 14 is a schematic block diagram of an embodiment of a co-processing system 100. The co-processing system 100 generally comprises an input and output unit (I/O) 110 for receiving a video frame and a corresponding depth map to co-process as disclosed herein. The I/O unit 110 can be a general interface or gateway to a memory or other connected device from which the co-processing system 100 receives the color and depth data. Alternatively, the I/O unit 110 is represented by a receiver and transmitter, such as a transceiver, capable of conducting communication with a remote device through wired or wireless connection.

In either case, the received video frame and depth map are either directly forwarded from the I/O unit 110 to an edge detector 120 or is first entered in a memory 150 present in the co-processing system 100 or at least available for the co-processing system 100 and then forwarded to the edge detector 120. The edge detector 120 detects at least one edge in the video frame based on the respective color values of at least a portion of the video frame. The edge detector 120 also detects at least one corresponding edge in the depth map based on respective depth values of at least a portion of the depth map. The edge detection conducted by the edge detector 120 is preferably conducted using any of the previously mentioned edge detection algorithms or some other edge detection algorithm known in the art and able to be implemented in software, hardware or a combination of hardware and software. The edges are preferably detected as the borders between regions having different depth values/color values or different distributions of depth values/color values in the depth map/video frame.

In an alternative approach, the edge detector 120 receives user data from a user input device, such as touch sensitive screen, mouse or keyboard, connected to the I/O unit 110. This user data is then further processed by the edge detector 120 for detecting the edges, typically by determining the coordinates of the detected edges in the video frame and the depth map. The manually entered user data can be used instead of or as a complement to the data provided by an edge detection algorithm.

An aligner 130 of the co-processing system 100 is provided for aligning the edges detected by the edge detector 120 and preferably the video frame and the depth map. A connected pixel identifier 140 uses the aligned data from the aligner 130 in order to identify at least one pixel in the video frame or, preferably, the depth map having incorrect pixel property value. More particularly, the pixel identifier 140 performs the pixel identification based on the position of the pixel in the depth map or video frame relative an edge in the depth map or video frame and a corresponding, aligned edge in the video frame or depth map.

In an embodiment, the pixel identifier 140 identifies the at least one pixel as being enclosed by the edge in the depth map and the corresponding, aligned edge in the video frame. This identification is conducted by comparing the coordinate of the at least one pixel with the coordinates of the edges detected by the edge detector 120. Thus, a correct edge in the video frame has pixel coordinate $(x_2, y)$ at a particular point. The corresponding point of the aligned edge in the depth map has pixel coordinate $(x_1, y)$, where $x_1 < x_k$. This means that all pixels in the depth map having coordinates $(x_1+1, y)$ to $(x_2, y)$ are incorrectly estimated and belong to the wrong side of the edge or border in the depth map.

An optional but preferred value processor 160 is arranged in the co-processing system 100 for replacing the pixel property value of the pixel identified by the pixel identifier 140 with a corrected pixel property value equal to or determined from the pixel property value or values of at least one other pixel in the depth map or video frame. The at least one pixel in the depth map or video frame to use as correction basis for the incorrect pixel preferably belongs to a same region in the depth map or video frame as the incorrect pixel, where the regions in the depth map or video frames are defined by the edges detected by the edge detector 120.

An optional scale processor 170 is arranged for re-scaling one of the depth map and the video frame to correspond to the size and resolution in terms of number of pixels as the other of the depth map and the video frame. The scale processor 170 preferably performs pixel interpolation to conduct an upscaling of the one of the depth map and the video frame that has lower resolution than the other of the depth map and the video frame. The at least one pixel identified by the pixel identifier 140 is then preferably one of the interpolated pixels in the depth map or video frame.

The units 110-140, 160 and 170 of the co-processing system 100 can be implemented in hardware, software or a combination of hardware and software.

For a software implemented embodiment, the co-processing functionality may be embodied on a computer-readable medium or memory, such as a hard drive of a computer or other image or video processing unit, ROM, RAM. A particular embodiment relates to a computer program product having a set of machine readable instructions which, when installed in a computer having a suitable operating system and memory means, configures the computer to be operable to perform the co-processing functionality disclosed herein. In the this context, computer should be interpreted broadly to include any processing device, terminal, unit or system having means for effecting the co-processing functionality defined by the computer program product.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Boykov and Kolmogrov, "An experimental compression of min-cut/max-flow algorithms for energy minimization in vision", *IEEE Transactions on Pattern Analysis and Machine Intelligence*, vol. 26, no. 9, pages 1124-1137, 2004

[2] Bleyer and Gelautz, "Graph-based surface reconstruction from stereo pairs using image segmentation", in *SPIE*, vol. 5665, pages 288-299, 2005

[3] Felzenszwalb and Huttenlocher, "Efficient belief propagation for early vision", in *CVPR*, pages 261-268, 2004

[4] Hong and Chen, "Segment-based stereo matching using graph cuts", in *CVPR*, pages 74-81, 2004

[5] Zitnick et al., "High-quality video view interpolation using a layered representation", in *ACM SIGGRAPH*, vol. 23, no. 3, pages 600-608, 2004

[6] Ziou and Tabbone, "Edge detection technologies—An overview", *International Journal of Pattern Recognition and Image Analysis*, vol. 8, no. 4, pages 537-559, 1998

The invention claimed is:

1. A method of co-processing a video frame comprising multiple pixels having respective color values as pixel property values of a camera view and a depth map comprising multiple pixels having respective depth values as pixel property values of said camera view, said method comprising:
   detecting at least one edge in said video frame based on respective color values of at least a portion of said multiple pixels in said video frame;
   detecting at least one edge in said depth map based on respective depth values of at least a portion of said multiple pixels in said depth map;
   aligning said at least one edge in said video frame and said at least one edge in said depth map; and
   identifying at least one pixel in said video frame or said depth map having an incorrect pixel property value based on a position of said at least one pixel in said video frame or said depth map relative to an edge in said video frame or said depth map and the corresponding aligned edge in the other of said video frame and said depth map.

2. The method according to claim 1, further comprising:
   determining a replacement pixel property value based on a pixel property value of at least one other pixel in one of said video frame and said depth map; and
   replacing said incorrect pixel property value with the replacement pixel property value.

3. The method according to claim 2, wherein said at least one edge in said video frame divides said video frame into multiple regions having different distributions of color values, and said at least one edge in said depth map divides said depth map into multiple regions having different distributions of depth values, wherein determining the replacement pixel property value comprises determining the replacement pixel property value based on the pixel property value of at least one other pixel belonging to the same region in one of said video frame and said depth map as said identified pixel having said incorrect pixel property value.

4. The method according to claim 1, wherein detecting said at least one edge in said video frame comprises detecting said at least one edge in said video frame as at least one border between multiple regions in said video frame having different distributions of color values.

5. The method according to claim 1, wherein detecting said at least one edge in said depth map comprises detecting said at least one edge in said depth map as at least one border between multiple regions in said depth map having different distributions of depth values.

6. The method according to claim 1, further comprising re-scaling one of said video frame and said depth map to a same size in terms of pixels as the other of said video frame and said depth map prior to said aligning.

7. The method according to claim 6, wherein re-scaling one of said video frame and said depth map comprises up-scaling one of said video frame and said depth map by interpolating pixel property values of two or more pixels to form at least one new pixel in said one of said video frame and said depth map having at least one interpolated pixel property value.

8. The method according to claim 7, wherein identifying at least one pixel having the incorrect pixel property value comprises identifying at least one pixel among said at least one new pixel based on said position of said at least one pixel relative to said edge in said video frame or said depth map relative to said corresponding aligned edged in the other one of said video frame and said depth map.

9. The method according to claim 1, wherein identifying said at least one pixel having the incorrect pixel property value comprises identifying said at least one pixel as being enclosed by said edge in said video frame or said depth map and the corresponding aligned edge in the other one of said video frame or depth map.

10. The method according to claim 1, wherein identifying said at least one pixel having the incorrect pixel property value comprises identifying at least one pixel in said depth map having an incorrect depth value based on a position of said at least one pixel in said depth map relative to an edge in said depth map and the corresponding aligned edge in said video frame.

11. A system for co-processing a video frame comprising multiple pixels having respective color values as pixel property values of a camera view and a depth map comprising multiple pixels having respective depth values as pixel property values of said camera view, said system comprising:
  an edge detector for detecting at least one edge in said video frame based on respective color values of at least a portion of said multiple pixels in said video frame, and detecting at least one edge in said depth map based on respective depth values of at least a portion of said multiple pixels in said depth map;
  an aligner for aligning said at least one edge detected in said video frame and said at least one edge detected in said depth map; and
  a pixel identifier for identifying, based on said aligning performed by said aligner, at least one pixel in one of said video frame and said depth map having an incorrect pixel property value based on a position of said at least one pixel in said video frame or said depth map relative an edge detected by said detector in said video frame or depth map and a corresponding aligned edge in the other one of said video frame or depth map.

12. The system according to claim 11, further comprising a value processor configured to determine a replacement pixel property value based on a pixel property value of at least one other pixel in one of said video frame and said depth map, and to replace said incorrect pixel property value with the replacement pixel property value.

13. The system according to claim 12, wherein said at least one edge detected in said video frame divides said video frame into multiple regions having different distributions of color values, and said at least one edge detected in said depth map divides said depth map into multiple regions having different distributions of depth values, and wherein said value processor is configured to determine the replacement pixel property value based on the pixel property value of at least one other pixel belonging to a same region in one of said video frame and said depth map as said identified pixel having said incorrect pixel property value as identified by said pixel identifier.

14. The system according to claim 11, wherein said edge detector is configured to detect said at least one edge in said video frame by detecting at least one border between multiple regions in said video frame having different distributions of color values, and to detect said at least one edge in said depth map by detecting at least one border between multiple regions in said depth map having different distributions of depth values.

15. The system according to claim 11, further comprising a scale processor configured to re-scale one of said video frame and said depth map to a same size in terms of pixels as the other of said video frame and said depth map prior to said aligner aligning said at least one edge detected in said video frame and said at least one edge detected in said depth map.

16. The system according to claim 15, wherein scale processor is configured to up-scale said one of said video frame and said depth map using interpolation of pixel property values of two or more pixels to form at least one new pixel in said one of said video frame and said depth map having at least one interpolated pixel property value.

17. The system according to claim 16, wherein said pixel identifier is configured to identify at least one pixel having the incorrect pixel property value by identifying at least one pixel among said at least one new pixel based on said position of said at least one pixel relative an edge in said video frame or said depth map relative to said corresponding aligned edge in the other one of said video frame and said depth map.

18. The system according to claim 11, wherein said pixel identifier is configured to identify said at least one pixel having the incorrect pixel property value by identifying said at least one pixel as being enclosed by an edge in one of said video frame and said depth map and the corresponding aligned edge in the other one of said video frame and said depth map.

19. The system according to claim 11, wherein said pixel identifier is configured to identify said at least one pixel having the incorrect pixel property value by identifying at least one pixel in said depth map having an incorrect depth value based on a position of said at least one pixel in said depth map relative to an edge in said depth map and the corresponding aligned edge in said video frame.

* * * * *